US006377965B1

(12) United States Patent
Hachamovitch et al.

(10) Patent No.: US 6,377,965 B1
(45) Date of Patent: *Apr. 23, 2002

(54) AUTOMATIC WORD COMPLETION SYSTEM FOR PARTIALLY ENTERED DATA

(75) Inventors: Dean J. Hachamovitch, Bellevue; Ronald A. Fein, Seattle; Edward J. Fries, Kirkland, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/965,916

(22) Filed: Nov. 7, 1997

(51) Int. Cl.[7] .............................................. G06F 17/00
(52) U.S. Cl. ...................... 707/534; 707/533; 707/531; 707/530
(58) Field of Search .............................. 707/533, 531, 707/530, 534, 500, 507, 513, 5, 104

(56) References Cited

U.S. PATENT DOCUMENTS

| | | | |
|---|---|---|---|
| 4,558,302 A | 12/1985 | Welch | 341/51 |
| 4,814,746 A | 3/1989 | Miller et al. | 341/95 |
| 4,955,066 A | 9/1990 | Notenboom | 382/240 |
| 4,969,097 A | 11/1990 | Levin | 707/534 |
| 5,109,433 A | 4/1992 | Notenboom | 382/240 |
| 5,261,091 A | 11/1993 | Yuyama | 707/4 |
| 5,367,453 A | 11/1994 | Capps et al. | 707/531 |
| 5,734,749 A | * 3/1998 | Yamada et al. | 382/187 |
| 5,761,689 A | * 6/1998 | Rayson et al. | 707/533 |
| 5,805,911 A | * 9/1998 | Miller | 707/534 |
| 5,845,300 A | * 12/1998 | Comer et al. | 707/508 |
| 5,896,321 A | * 4/1999 | Miller et al. | 365/189.01 |
| 5,900,004 A | * 5/1999 | Gipson | 707/530 |
| 5,926,811 A | * 7/1999 | Miller et al. | 707/5 |

OTHER PUBLICATIONS

Townsend et al., Microsoft Office 6 in 1, chapter 25 pp. 212–215, Jan. 1994.*

Harrison, Malcolm C., "Implementation of the Substring Test by Hashing," in *Communications of the ACM*, Dec. 1971, vol. 14, No. 12, pp. 777–779.

(List continued on next page.)

*Primary Examiner*—John Breene
*Assistant Examiner*—Greta L. Robinson
(74) *Attorney, Agent, or Firm*—Merchant & Gould (57) ABSTRACT

A word completion system that can automatically predict unrestricted word completions for data entries in an unstructured portion of a data file. The word completion system applies prediction criteria to avoid annoying the user by displaying an excessive number of wrong suggestions. Suggested word completions, which may change as the user types a partial data entry, are displayed in a non-disruptive manner and selected using traditional acceptance keystrokes, such as the "tab" key or the "enter" key. The word completion system may be deployed on an individual application program basis or on a application-independent basis. Because different word suggestion lists may be appropriate for different application programs, and for different data files created with the same application program, the word completion system allows the user to select one or more suggestion lists for use with each data file. A user interface allows the user to customize each suggestion list on an on-going basis. Each suggestion list may contain dynamic word completions that are tied to dynamic parameters maintained by the computer system, such as the time, date, registered user, and so forth. Each suggestion list may also be tied to contextual information, such as structured data fields or context labels assigned manually or by a document-creation aid known as a "wizard."

24 Claims, 6 Drawing Sheets

OTHER PUBLICATIONS

McCreight, Edward M., "A Space–Economical Suffix Tree Construction Algorithm," in *Journal of the Association for Computing Machinery*, Apr. 1976, vol. 23, No. 2, pp. 262–272.

"Programmer's Reference Vol. 1: Overview," for the Microsoft Windows Operating System, for Microsoft Windows Version 3.1, by Microsoft Corporation. U.S. Patent No. 4,974,159.

Darrah, John J. and Witten, Ian H., "The Reactive Keyboard," in *Cambridge Series on Human–Computer Interaction*, Cambridge University Press 1992, pp. 22–65, 88–125.

* cited by examiner

| NAME | COMPLETION | CONTEXT | CAPITALIZATION |
|---|---|---|---|
| Key(Date) | Key(Date) | Any | Any |
| Microsoft Corporation | Microsoft Corporation One Microsoft Way Redmond, Wa 98052 | Addresse | Initial Cap Only |
| Very truly yours, | Very truly yours, | Salutation | Initial Cap Only |
| ⋮ | ⋮ | ⋮ | ⋮ |
| Symposium | Save The Whales Symposium | Any | Initial Cap Only |

AUTOMATIC WORD COMPLETION SYSTEM FOR PARTIALLY ENTERED DATA

TECHNICAL FIELD

This invention relates generally to the field of data entry systems and, more particularly, to automated word completion systems for operating with unstructured data files, such as word processing documents and e-mail messages.

BACKGROUND OF THE INVENTION

General purpose digital computers are widely used for a large variety of text-based applications, including word processing, e-mail, spreadsheets, personal calendars, etc. To use the computer for one of these purposes, a user typically types on a keyboard to enter text and commands into an active data file, which is open within an application program running on the computer. Other text input devices include a voice recognition interface, a touch-sensitive screen overlaid on top of a graphical image of a keyboard, or a system that detects the motion of a pen in combination with handwriting recognition software. The text and commands are then interpreted and manipulated by the application program in accordance with the syntax and functionality implemented by the application program.

For many users, the most time consuming computer activity is the entry of large amounts of text into various data files, such as word processing files and e-mail files. Regardless of the input method used, the speed at which the text can be entered into the computer is a major factor governing the user's efficiency. The designers of text-intensive application programs have therefore developed text-input aids to assist users in entering text into the computer.

A word prediction system is an example of such a text-input aid. Generally stated, a word prediction system predicts and suggests complete data entries based on partial data entries. This allows the user to type in a partial data entry and then accept a predicted word completion with a single keystroke, thus avoiding the keystrokes that would have been required to type the complete data entry. For example, a word prediction system may be configured to recognize a user's name so that the user's complete name, "Dean Hachamovitch" for instance, may be predicted after the user types the first few letters, "Dea" in this example.

Creating word prediction systems that exhibit acceptable memory-use and performance characteristics, and that are not overly disruptive or annoying to the user, is an on-going challenge for software developers. Three techniques have traditionally been used to meet this challenge: (1) organizing the user's document into structured fields; (2) restricting the data space used to predict word completions; and (3) requiring the user to request a word prediction when desired. As the drawbacks associated with each of these techniques are described below, it will become clear that there is a continuing need for word prediction systems that automatically predict unrestricted word completions for data entries in an unstructured portion of a data file, such as the body of a word processing document or e-mail message.

Because there are a limited number of words available in any given language, many of the words forming the vocabulary of the language are used frequently. This is particularly true for data files that include structured fields for certain data entries, such as the "from" and "to" fields of an e-mail message, or the "payee" and "amount" fields of a bank check. A structured field supplies a context for data to be entered into the field. This context can be used to limit the choice of word predictions for the field, and increase the likelihood that a suggested word completion is correct. Word prediction systems therefore work well for structured data fields because the choice of words used in a particular structured field can often be sufficiently limited so that the word prediction system can offer reasonably likely suggestions within acceptable memory-use and performance characteristics.

Most-recently-used (MRU) text completion has been deployed in connection with structured data fields to speed text entry and also serve as a memory aid for repetitive data entries. These word prediction methods use an MRU data entry list for each structured field to provide a list of word prediction choices for the field. That is, a list of the most recent items entered into the structured field is used to suggest word completions for partial data entries entered into the field. For example, a personal finance program may maintain a record of a person's previous bank checks. In order to speed entry of the check payee on a new check, the program keeps an MRU list of prior check payees. This list is used to automatically suggest a completion for the payee name after the first few letters of the payee have been typed by the user. For instance, if a user has previously written checks to "Georgia Power," the complete data entry "Georgia Power" may be suggested after the letters "Ge" have been typed into the check payee field.

In MRU word prediction systems, an input character may be analyzed, with respect to the prior history of text entered, to predict the text likely to follow the input character or string of characters. Because MRU word prediction systems are based upon a prior history of text entered, the search time and amount of storage required for the systems are important parameters. Either a linear or a binary search is typically used to scan the text history in order to provide a text prediction. A linear search operates by sequentially examining each element in a list until the target element is found or the list has been completely processed. Because every entry must be analyzed, linear searches are primarily used with very short lists.

A binary search locates an item by repeatedly dividing an ordered list in half and searching the half that it is known to contain the item. This requires a value for the input that can be compared against values in a list of items arranged in a known sequence, such as ascending numerical order corresponding to alphabetical placement. The binary search begins by comparing the input value against the value in the middle of the list. If the input value is greater than the middle value, the lower half of the list is discarded and the search concentrates on the upper half. The input value is again compared with a value in the middle of the new list and again half of the list is discarded. The process continues, with the input value being compared against the middle of each succeeding smaller list, until the desired item is found.

Both linear and binary searches can require substantial time to complete, particularly for large search lists. MRU word prediction systems therefore tend to be costly in terms of computation resources and performance. Also, without a mechanism for increasing the likelihood of making a correct prediction, such as structured fields in the input data file, the word prediction system may make wrong predictions so often that the system may be perceived as more annoying than useful. For this reason, MRU word prediction systems have typically been deployed in connection with structured fields.

Restricting the search field using a limited word prediction data space, such as a known data range or naming syntax, is another approach to improving the performance of a word prediction system. For example, a spreadsheet program may use the data entries in adjacent rows and columns as a limited data space list for selecting word prediction choices when the user is entering a new heading into the spreadsheet. Similarly, an editing program for software development may use a predefined list of valid function and command names as a limited data space for selecting word prediction choices when the user is writing a software program. Or a filing system may use the list of previously-created file names as a limited data space for selecting word prediction choices when the user is selecting a file. Of course, these limited-data-space word prediction systems only work well when there is a limited and well-defined data space to use for selecting word predictions. They are not well suited to automatic application for all data entries in an unstructured portion of a data file because, in this situation, there is not a readily apparent limited and well-defined data space to use for selecting word prediction choices.

Dictionary-based word prediction systems, such as those found in spell-checking utilities, have also been used in prior word prediction systems. With a dictionary-based word prediction system, the user must activate the spell-checking utility to obtain a suggested spelling for a particular data entry. It would be very disruptive if the spell-checking user interface automatically popped-up with a list of suggested words every time the user entered a data entry that the spell-checker construed as a misspelled word. In addition, the suggestions provided by the spell-checking utility do not typically change based on the context of the data entry, such as a structured field in the data file. Instead, the dictionary-based word prediction system provides the same spelling suggestions regardless of any contextual information that may be ascertained regarding a data entry. Conventional dictionary-based word prediction systems would therefore be overly disruptive if automatically applied for all data entries in an unstructured portion of a data file.

Prior word prediction systems have additional shortcomings when deployed in the multiple-application-program environment that exists on most computer systems. Computer systems often allow for multiple application programs to run simultaneously. For example, a word processing application program, an e-mail application program, and a personal calendar program may all run simultaneously on a typical computer system. User interfaces for these application programs typically appear in different windows displayed on a display screen. The user selects one window at a time to receive input, and then inputs text and commands into the selected window using the keyboard or another text input device.

The word prediction systems discussed above are usually deployed on an individual application program basis. That is, each word prediction system is typically customized to work only with one particular application program. For example, the check writing word prediction system discussed previously works only with the check writing application program, and not with other application programs, such as a word processor or e-mail program running on the same computer system. This causes wasteful duplication of software when similar word prediction systems are implemented by several different application programs. Duplication of items stored in memory can also result. For example, duplicate items may be stored in memory when several different applications keep separate MRU histories or dictionaries. Another problem is that repetitive data entries cannot be identified across several application programs. As a result, the user may have to "teach" several word predictions systems the same set of commonly-used data entries, such as the user's name, address, business name, etc.

Thus, there is a need in the art for a word prediction system that automatically predicts unrestricted word completions for data entries in an unstructured portion of a data file, such as the body of a word processing document or e-mail message. There is a further need for a text prediction system that may operate with multiple application programs with little or no application-specific programming.

SUMMARY OF THE INVENTION

The present invention is a word completion system that can automatically predict unrestricted word completions for data entries in an unstructured portion of a data file, such as the body of a word processing document or email message. The word completion system applies prediction criteria to avoid annoying the user by displaying an excessive number of wrong suggestions. Suggested word completions, which may change as the user types a partial data entry, are displayed in a non-disruptive manner and selected using traditional acceptance keystrokes, such as the "tab" key or the "enter" key.

The word completion system may be deployed on an individual application program basis or on an application-independent basis. Application independence is the ability of the same word completion system to work with several different application programs, such as a word processing program, an e-mail program, a spreadsheet program, and so forth. Because different word suggestion lists may be appropriate for different application programs, and for different data files within the same application program, the word completion system allows the user to select one or more suggestion lists for use with each data file. In addition, the individual entries of a word completion list may be limited so that they are only used in certain context-based situations. These context-based limitations effectively allow each word completion list to be subdivided into a group of context-sensitive lists.

A word completion user interface allows the user to customize each suggestion list with user-defined name-completion pairs on an on-going basis. Each suggestion list may also contain certain word completions that are tied to dynamic parameters maintained by the computer system, such as the time, date, registered user, etc. Each suggestion list may also be limited to name-completion pairs in which the completion entries have a predefined property, such as initial letter capitalized, all letters capitalized, occurring at the start of a paragraph, occurring at the end of a paragraph, and so forth. Each suggestion list may also be limited to name-completion pairs that are tied to contextual information, such as structured data fields or context labels assigned manually or by a document-creation aid known as a "wizard."

Generally stated, the invention is a computer-readable medium having computer-executable instructions for running a word completion utility on a computer system. The word completion utility monitors data entry into a data file associated with a program module running on the computer system. The word completion utility identifies a partial data entry in an unstructured portion of the data file, such as the body of a word processing document or e-mail message. The word completion utility selects a suggestion list including a plurality of associated name-completion pairs, each name-completion pair including a name entry and a completion entry. The word completion utility identifies a particular one of the name entries in the suggestion list that corresponds to the partial data entry. The word completion utility then applies prediction criteria to the particular name entry, the particular completion entry, and the partial data entry. If the prediction criteria are met, the word completion utility displays the associated completion entry as a word completion suggestion for the partial data entry. Advantageously, the suggestion list, as well as name-completion pairs within the suggestion list, may be specified by the user.

The word completion utility may then receive a command indicating acceptance of the completion entry. In response, the word completion utility replaces the partial data entry with the completion entry in the data file. The word completion utility may then identify a character immediately following the command indicating acceptance of the completion entry. In response, the word completion utility determines whether the character is a delimiter character. If the character is a not a delimiter character, the word completion utility inserts a space character in the data file between the completion entry and the character.

According to an aspect of the invention, a suggestion list may limited to name-completion pairs in which the completion entries have a predefined property, such as initial letter capitalized, all letters capitalized, occurring at the start of a paragraph, occurring at the end of a paragraph, and so forth. In addition, the partial data entry may be received in a portion of the data file that has been assigned a context label. In this case, a particular suggestion list may be associated with the context label. For example, a document-creation aid known as a "wizard" may assign paragraph style labels to the various paragraphs in a business letter. Thus, the greeting paragraph may be assigned a "greeting" context label, the body paragraphs may be assigned a "body" context label, and the complimentary closing paragraph may be assigned a "complimentary closing" context label. This allows the suggestion list for the complimentary closing paragraph, for instance, to be limited to a relatively small set of conventional complimentary closing phrases, such as "Sincerely yours," "Very truly yours," "Cordially yours," and the like.

According to another aspect of the invention, the completion entry may be tied to a dynamic parameter maintained by the computer system, such as the current date, the current time, or the registered user of the computer system. This allows a current date name entry, for example, to be tied to the computer system's clock. Thus, the current date, "June 26, 1997," for instance, may be automatically suggested whenever the user enters the first few letters of the corresponding month, "Jun" in this case.

According to yet another aspect of the invention, the prediction criteria includes a first condition that the partial data entry include a certain number of characters. The prediction criteria may also include a second condition that the completion entry include a certain number of characters more than the partial data entry. The prediction criteria may further include a third condition that the partial data entry unambiguously correspond to the particular name entry with respect to all of the name entries in the suggestion list. The prediction criteria increases the likelihood that each word completion suggestion will be correct, which avoids annoying the user with an excessive number of wrong suggestions.

That the invention improves over the drawbacks of prior word prediction systems and accomplishes the advantages described above will become apparent from the following detailed description of the exemplary embodiments and the appended drawings and claims.

DETAILED DESCRIPTION OF EXEMPLARY EMBODIMENTS

The invention may be implemented as a word completion system that can automatically predict unrestricted word completions for data entries in an unstructured portion of a data file. Unrestricted word completions need not be selected from a suggestion list that is limited to a particular data space, such as a data range or a predefined naming syntax. Rather, unrestricted word completions may be based on a suggestion list including virtually any number of user-defined name-completion pairs. Because different word suggestion lists may be appropriate for different application programs, and for different data files within the same application program, the word completion system allows the user to select one or more suggestion lists for use with each data file.

The word completion system applies prediction criteria to avoid annoying the user by displaying an excessive number of wrong suggestions. For example, the suggested word completions are not displayed unless the partial data entry has at least three characters, the completion entry has at least three characters more that the partial data entry, and the partial data entry unambiguously corresponds to one particular name-completion pair in the selected suggestion list.

Suggested word completions, which may change as the user types a partial data entry, are displayed in a non-disruptive manner. Specifically, a word suggestion field appears in a word completion frame above the partial data entry such that the suggestion and the partial data entry are vertically aligned. This makes it easy for the user to compare the suggestion to the partial data entry. If the suggestion is too long to display directly above the partial data entry, it is truncated with ellipses (i.e., . . . ) so that the suggestion and the partial data entry are still displayed in vertical alignment. The user accepts a suggestion using traditional acceptance keystrokes, such as the "tab" key or the "enter" key.

The word completion system implements intelligent ending space management. Specifically, the word completion system receives a command indicating acceptance of the completion entry. In response, the word completion utility replaces the partial data entry with the completion entry in the data file. The word completion utility may then identify a character immediately following the acceptance command. The word completion utility determines whether the character is a delimiter character and, if the character is a not a delimiter character, the word completion utility inserts a space character in the data file between the completion entry and the character.

A pop-up word completion user interface allows the user to customize each suggestion list with user-defined name-completion pairs on an on-going basis. Each suggestion list may also contain certain word completions that are tied to dynamic parameters maintained by the computer system, such as the time, date, registered user, etc. For example, this allows a current date name entry to be tied to the computer system's clock. Thus, the current date, "June 26, 1997," for instance, may be automatically be suggested whenever the user enters the first few letters of the corresponding month—"Jun" in this case. In addition, the user may preferably suggest the format in which the data will be displayed, for example, "June 26, 1997," "26 June 1997," or "9/26/97."

Each suggestion list may also be limited to name-completion pairs in which the completion entries have a predefined property, such as initial letter capitalized, all letters capitalized, occurring at the start of a paragraph, occurring at the end of a paragraph, and so forth. For example, the word completion "Microsoft Corporation" is only suggested when the partial data entry begins with the "M" capitalized. Thus, the word completion system does not suggest "Microsoft Corporation" when the user types "mic" on the way to typing "microphone" or "microcomputer."

Each suggestion list may also be limited to name-completion pairs that are tied to contextual information, such as structured data fields. For example, an e-mail address book may be used as the suggestion list when a user is typing within a structured address frame of an e-mail user interface.

The suggestion list may also be limited to name-completion pairs that are tied to context labels assigned manually or by a document-creation aid known as a "wizard." A letter wizard, for example, may assign paragraph style labels to the various paragraphs in a business letter. Thus, the greeting paragraph may be assigned a "greeting" context label, the body paragraphs may be assigned a "body" context label, and the complimentary closing paragraph may be assigned a "complimentary closing" context label. This allows the suggestion list for the complimentary closing paragraph, for instance, to be limited to a relatively small set of conventional complimentary closing phrases, such as "Sincerely yours," "Very truly yours," "Cordially yours," and the like.

The word completion system may be deployed within an individual application program, particularly a word processing application program or an e-mail application program. Alternatively, the word completion system may be deployed within an operating system or as a stand-alone utility that may operate on an application-independent basis. Application independence is the ability of the same word completion system to work with several different application programs, such as a word processing program, an e-mail program, a spreadsheet program, a personal calendar program, and so forth.

To deploy the word completion system as an application-independent utility, an interface is defined within each application program through which the word completion utility may communicate with each application program. This allows the word completion utility to monitor the entry of characters into the application program user interface, to determine the location within the user interface to display the word completion frame, and to determine when the user had invoked the word completion user interface. The only potential drawback of an application-independent deployment may be a slight reduction in the speed at which the word completion system performs its operations.

Exemplary Operating Environment

Figure 1:
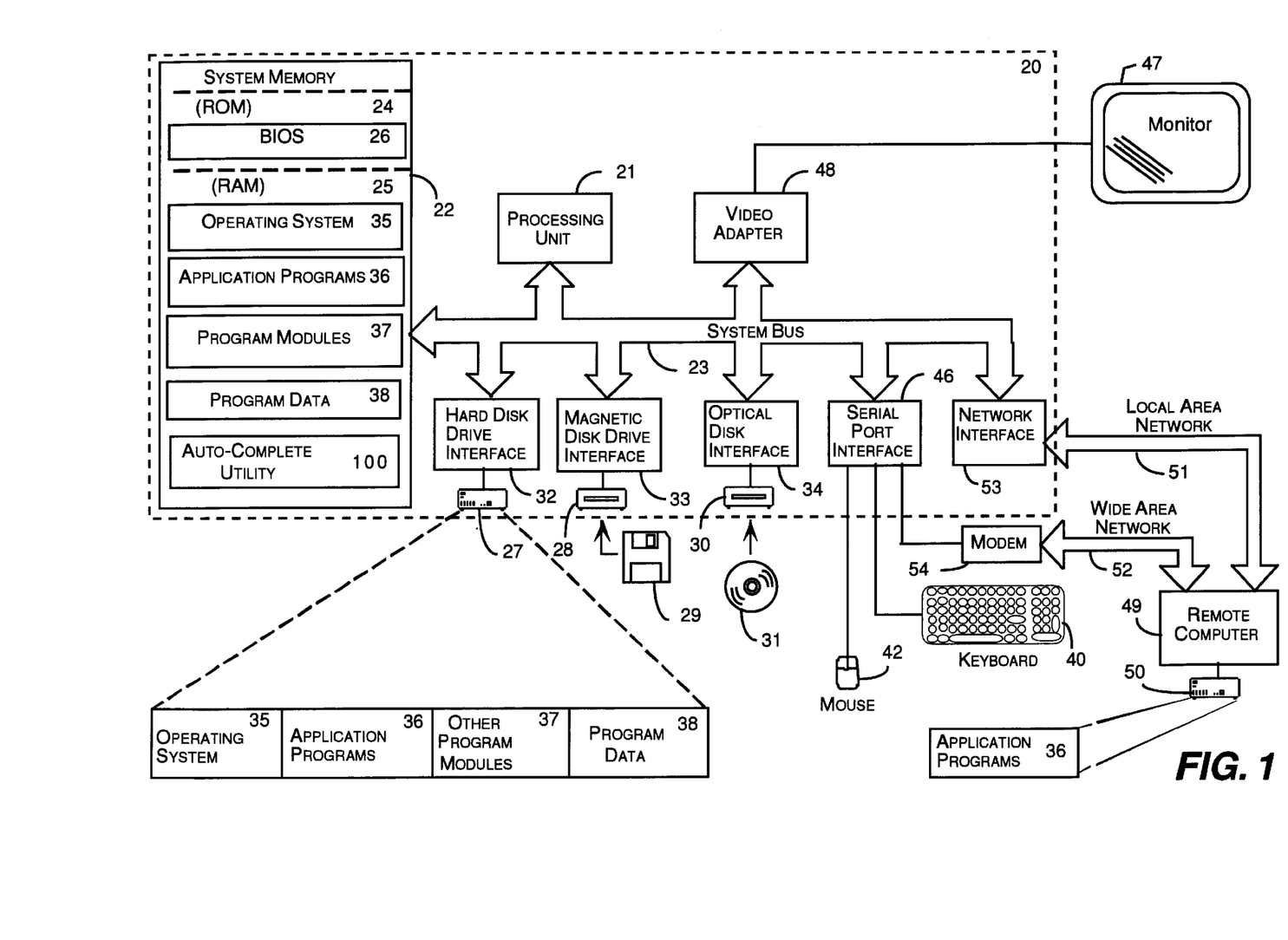
FIG. 1 is a functional block diagram of a personal computer system that provides the operating environment for the exemplary embodiments of the invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both map entity and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. In particular, one of the program modules is an Auto-Complete utility 100 that includes certain embodiments of the invention, which are described below with reference to FIGS. 2–7. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary embodiments of the present invention are incorporated into the MICROSOFT OFFICE 97 suite of application programs sold by Microsoft Corporation on CD-ROM for use with personal computer systems such as the illustrative personal computer 20. The invention may be deployed within, or in connection with, the OFFICE 97 suite of application programs including, among others, a WORD 97 word processing application program and an OUTLOOK 97 e-mail application program. It will be appreciated that the principles of the invention are not limited word processing and e-mail application programs, but could equivalently be applied to any computer-implemented system that involves a substantial amount of text entry. For example, it is anticipated that the invention may be deployed in connection with future versions of Microsoft's personal calendar applications programs, spread sheet programs, database programs, and so forth. It will be further appreciated that the invention could equivalently be implemented on host computers other than personal computers, and could equivalently be transmitted to the host computer by means other than a CD-ROM, for example, by way of the network connection port 24.

Notwithstanding the broad applicability of the principles of the invention described above, it should be understood that the configuration of the exemplary embodiment as an application-independent utility for widely-used personal computers provides significant advantages. In particular, the Auto-Complete utility 100 described herein is specifically designed to exhibit acceptable memory-use and performance characteristics when implemented on the conventional personal computer system 20. In so configuring the AutoComplete utility 100, certain trade-off balances, particularly between the often conflicting goals of minimizing memory storage and increasing performance speed, have necessarily been struck. It should be understood that variations of the trade-off balances struck in the exemplary embodiments described herein are within the spirit and scope of the present invention, particularly in view of the fact that inevitable improvements in computer hardware and memory storage devices will make other trade-off balances feasible.

Figure 2A:
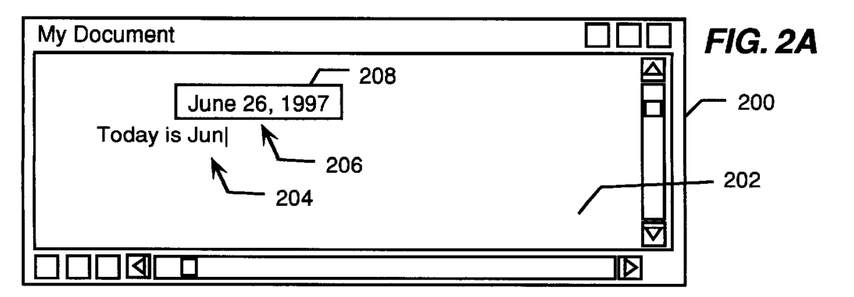
FIG. 2A illustrates a graphical user interface for a data file including a word completion suggestion in which the completion entry of a name-completion pair is tied to a dynamic system parameter.

FIG. 2A illustrates a graphical user interface 200 for a data file including a word completion suggestion in which the completion entry of a name-completion pair is tied to a dynamic system parameter. The graphical user interface 200 includes an unstructured area 202 into which the user may enter free text using the keyboard 40 or another suitable text entry device. For example, the unstructured area 202 may be the body portion of an e-mail message, the input area of a word processing document, the notes area of a personal calendar file, etc. As the user types text into the unstructured area 202, the Auto-Complete utility 100 identifies a partial data entry 204, which is defined as a contiguous set of characters following a word boundary, such as a delimiter character. The host application program causes the partial data entry to be displayed in the usual manner, and the Auto-Complete utility 100 causes a completion suggestion 206 to be displayed in association with the partial data entry in a non-disruptive word completion field, such as a pop-up word completion frame 208 that appears directly above the partial data entry.

As discussed in more detail with reference to FIG. 3 below, the word completion suggestion 206 is identified by comparing the partial data entry 204 to the name entries in a suggestion list that includes a group of name-completion pairs. If the partial data entry 204 corresponds to the name entry of a name-completion pair within certain prediction criteria, the completion entry of the name-completion pair is displayed as the completion suggestion 206 in the word completion frame 208.

The completion suggestion 206 is displayed in vertical alignment with the partial data entry 204. This makes it easy for the user to compare the completion suggestion 206 to the partial data entry 204. If the completion suggestion 206 is too long to display directly above the partial data entry 204, it is truncated with ellipses (i.e., . . . ) so that the completion suggestion 206 and the partial data entry 204 are still displayed in vertical alignment. The user accepts a suggestion using a traditional acceptance keystroke, such as the "tab" key or the "enter" key.

In the example illustrated in FIG. 2A, the completion suggestion 206 is tied to a dynamic system parameter. Specifically, the completion suggestion 206 is the current date, shown as "June 26, 1997," which is tied to the computer system's clock. This allows the complete current date to be automatically suggested whenever the user enters the first few letters of the corresponding month, "Jun" in the example illustrated in FIG. 2A. Other completion suggestions may be tied to other dynamic system parameters, such as the time, the registered user's name, the registered user's business address, a logged-in user's name, a list of recent applications or documents, a most-recently-used (MRU) text buffer, an MRU e-mail address buffer, the computer's file directory, etc.

Figure 2B:
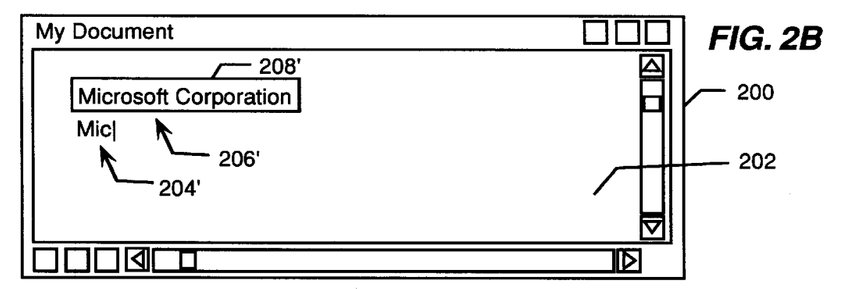
FIG. 2B illustrates a graphical user interface for a data file including a word completion suggestion in which the name-completion pairs of a suggestion list are limited to capitalized entries.

FIG. 2B illustrates a completion suggestion 206' selected from a suggestion list that is limited to name-completion pairs in which the completion entries have a predefined property, such as initial letter capitalized, all letters capitalized, occurring at the start of a paragraph, occurring at the end of a paragraph, and so forth. In this example, the word completion "Microsoft Corporation" is only suggested when the partial data entry begins with the "M" capitalized. Thus, the Auto-Complete utility 100 does not suggest "Microsoft Corporation" when the user types "mic" on the way to typing "microphone" or "microcomputer."

Figure 2C:
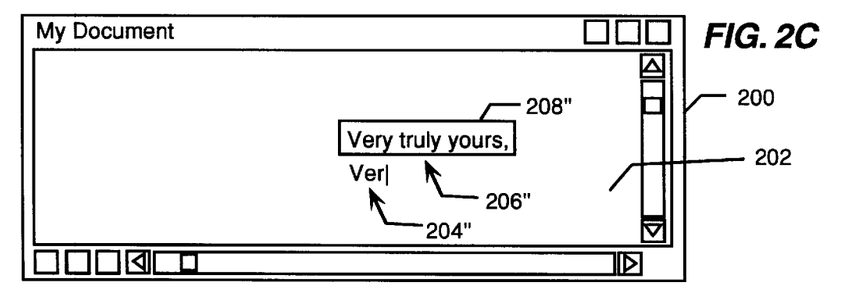
FIG. 2C illustrates a graphical user interface for a data file including a word completion suggestion in which the name-completion pairs of a suggestion list are limited based on a context label associated with a partial data entry.

FIG. 2C illustrates a word completion suggestion 206" selected from a suggestion list in which the name-completion pairs are limited to contextual information. In this example, the suggestion list is limited to name-completion pairs that are tied to context labels assigned by a document-creation aid known as a "letter wizard" that assigns paragraph style labels to the various paragraphs in a business letter. Thus, the greeting paragraph may be assigned a "greeting" context label, the body paragraphs may be assigned a "body" context label, and the complimentary closing paragraph may be assigned a "complimentary closing" context label. This allows the suggestion list for the complimentary closing paragraph, as shown in FIG. 2C, to be limited to a relatively small set of conventional complimentary closing phrases, such as "Sincerely yours," "Very truly yours," "Cordially yours," and the like.

Each suggestion list may also be limited to name-completion pairs that are tied to other types of contextual information, such as structured data fields. For example, an e-mail address book may be used as the suggestion list when a user is typing within a structured address frame of an e-mail user interface.

Figure 3:
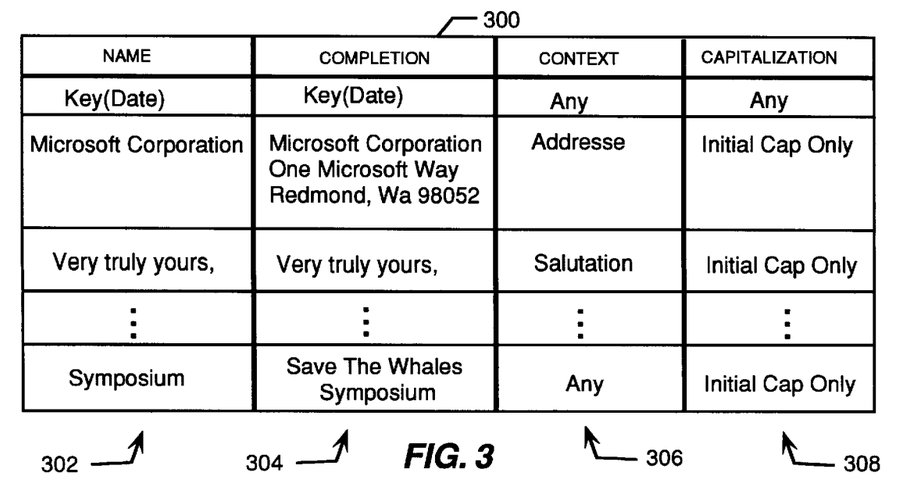
FIG. 3 is a diagram illustrating a word completion suggestion list with context-based and capitalization-based suggestion limitations.

FIG. 3 is a diagram illustrating a word completion suggestion list 300 with context-based and capitalization-based suggestion limitations. Each item in the suggestion list 300 includes a name entry 302 that is associated with a completion entry 304, thus forming a name-completion pair. The name entry 302 is compared against a partial data entry, which may have been entered by a user into a structured field or into an unstructured area of a data file. As noted previously, if the name entry 302 corresponds to the partial data entry within certain prediction criteria, the completion entry 304 associated with the name entry 302 is displayed as a completion suggestion for the partial data entry within the data file. The user may then accept the completion suggestion by entering a familiar data acceptance keystroke, such as the "tab" key or the "enter" key.

As shown in FIG. 3, each name-completion pair 302–304 may be associated with a context limitation 306 and/or a capitalization limitation 308. Within a data file, a partial data entry may be assigned a context. The context limitation 306 is used to denote a contextual limitation to allow each suggestion list to be limited to name-completion pairs 302–304 that are tied to contextual information. As noted previously, these contextual limitations may correspond to structured data fields in the data file, such as an e-mail address book when a user is typing within a structured address frame of an e-mail user interface. The suggestion list may also be limited to name-completion pairs 302–304 that are tied to context labels, such as those assigned by a document-creation aid that assigns paragraph style labels to the various paragraphs in a business letter.

The capitalization limitation 308 is used to denote a capitalization limitation to allow each suggestion list to be limited to name-completion pairs in which the completion terms are capitalized. For example, the word completion "Microsoft Corporation" is only suggested when the partial data entry begins with the "M" capitalized. Thus, the Auto-Complete utility 100 does not suggest "Microsoft Corporation" when the user types "mic" on the way to typing "microphone" or "microcomputer." In view of the context limitation 306 and the capitalization limitation 308 described above, many other types of limitation will become evident to those skilled in the art. For example, start of paragraph limitations (e.g., only suggest "To whom it may concern" at the beginning of a paragraph), end paragraph limitations (e.g., only suggest "Please call me if you have any questions regarding this matter" at the end of a paragraph), grammar-based limitations (e.g., suggest "there are" for "their are") document-type limitations (e.g., suggested completions for a business letter differ from suggested completions for a technical instruction manual), spelling-correction limitations, most-recently-used limitations, and so forth may be readily incorporated into a word completion system. In particular, these and other increasingly sophisticated word prediction methodologies may be deployed with acceptable performance characteristics as computer memory and computational performance improves in the future.

Figure 4A:
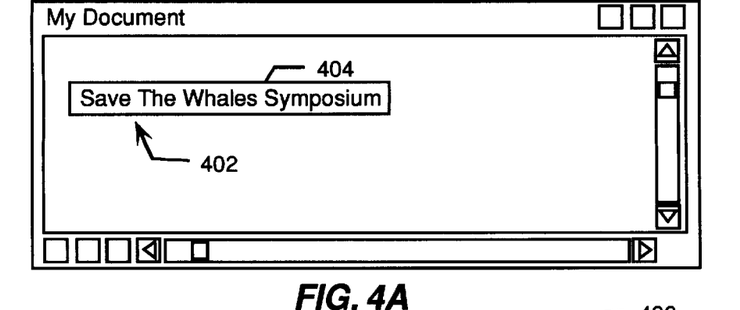
FIG. 4A is a diagram illustrating a data entry in a data file that has been selected for inclusion in a word completion suggestion list.
Figure 4B:
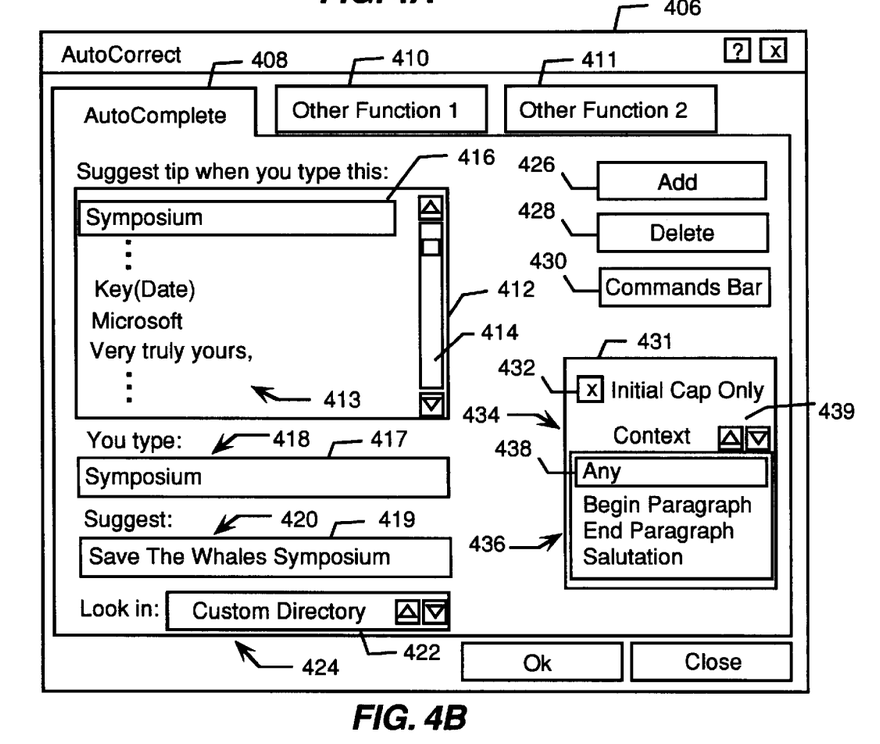
FIG. 4B is a diagram illustrating a word completion user interface for including the selected data entry of FIG. 4A in a suggestion list.
Figure 4C:
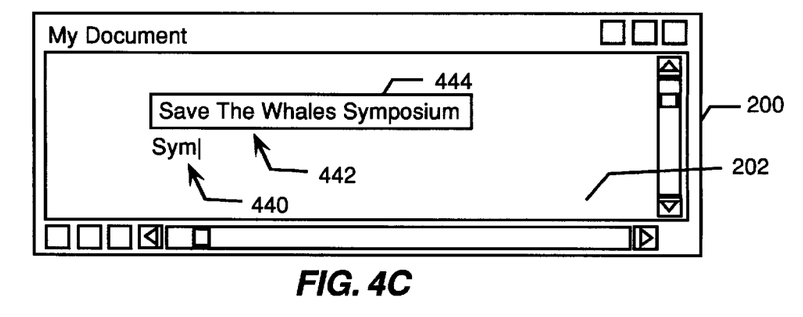
FIG. 4C is a diagram illustrating use of the selected data entry of FIG. 4A as a word completion suggestion after it has been included in a suggestion list.

The series FIGS. 4A–C shows an example illustrating a procedure for including a user-defined name-completion pair in a word completion suggestion list. In this example, the data entry "Symposium" is entered as the name entry and the data entry "Save the Whales Symposium" is entered as the completion entry of a name-completion pair. Creating this name-completion pair allows the user the type "Symposium" as a short-hand data entry that triggers the display "Save the Whales Symposium" as a completion suggestion. This example illustrates how the Auto-Complete utility 100 may be used as a user-defined keyboard accelerator.

FIG. 4A is a diagram illustrating a "Save the Whales Symposium" data entry 402, which a user has typed into an unrestricted area in a data file. The user then selects the data entry 402, as indicated by the selection indicator 404. Although the selection indicator 404 is shown as a box in FIG. 4A, selected text is typically indicated by inverting the visual display (e.g., if the document includes black text on a white background, the selected text is shown as white text on a black background). To use the data entry 402 in a name-completion pair for a word completion suggestion list, the user activates a user interface for the Auto-Complete utility 100, typically by entering "Alt-F3" or another predefined keystroke or keystroke combination., or by selecting a predefined user-interface control item This command causes a pop-up word completion user interface 406 to be displayed.

FIG. 4B is a diagram illustrating the word completion user interface 406, which is used to include the selected data entry 402 in a suggestion list. The word completion user interface 406 is typically one of several "AutoCorrect" user interfaces. The user selects the "Auto-Complete" selection tab 408 to invoke the word completion user interface 406. The user may invoke other Auto-Complete user interfaces, for example, by selecting the "Other Function 1" selection tab 410 or the "Other Function 2" selection tab 411. The selection tabs 408, 410, 411 are conveniently depicted as tabs on file folders to simulate a familiar file folder system.

The word completion user interface 406 includes a name entry item 412, which displays a scrollable list 413 of the name entries of a suggestion list. The user may use a scroll bar 414 to scroll through the list 413. The selected data entry 402, "Save the Whales Symposium," is automatically entered into the name entry list 413, in which it appears as the selected name entry, as indicated by the selection indicator 416. The selected name entry also automatically appears in a name entry edit box 417 as a selected name entry 418. In our example, the user has changed the selected name 418 entry from "Save the Whales Symposium" to "Symposium" in order to create the desired name-completion pair by modifying the contents of the name entry edit box 417.

The word completion user interface 406 also includes a completion entry edit box 419, which displays a selected completion entry 420 associated with the selected name entry 418 (i.e., the completion entry associated with the name entry item 412 indicated by the selection indicator 416). The selected data entry 402, "Save the Whales Symposium," is also automatically entered into a completion entry edit box 419 as the selected completion entry 420. Thus, the desired name-completion pair (i.e., "Symposium, Save the Whales Symposium") is ready to be saved in a selected suggestion list. Of course, the user may also edit the completion entry 420 by modifying the contents of the completion entry edit box 419, if desired.

The word completion user interface 406 also includes a an item, the suggestion list field 422, that allows the user to select different suggestion lists (i.e., different lists of name-completion pairs) or to create new suggestion lists. The suggestion list field 422 displays a selected suggestion list 424. The user may scroll through a number of suggestion lists or create a new suggestion list for the desired name-completion pair using the suggestion list field 422. The user may also scroll through the suggestion list field 422 to select one or more suggestion lists to be used to generate word completion suggestions as the user enters data into a particular data file (i.e., the data file the was active when the user word completion user interface 406 was invoked). For our example, the user has selected a suggestion list entitled "Custom Directory" as the list for the "Symposium, Save the Whales Symposium" name-completion pair. When a new suggestion list selected in the suggestion list field 422, the contents of the selected list appears in the scroll list 413. This allows the user to browse through the contents of the various suggestion lists.

The word completion user interface 406 also includes an "Add" button 426, which is used in our example to add the desired name-completion pair (i.e., "Symposium, Save the Whales Symposium") into the selected suggestion list (i.e., "Custom Directory"). A "Delete" button 428 may be selected to delete a selected name-completion pair from a selected suggestion list. In addition, a "Commands Bar" button 430 may be selected to invoke other functions of the user interface 406, such as capitalization and context limitation.

For example, selecting the "Commands Bar" button 430 may cause a context window 431 to be displayed. The context window 431 includes an initial capitalization selection box 432, which the user may select to limit the selected name-completion pair to use in connection with capitalized data entries. For our example, the initial capitalization selection box 432 is selected, indicating that the "Symposium, Save the Whales Symposium" name-completion pair is capitalization limited. The context window 431 also includes a context field 434, which displays a list of context options 436, such as "Any," "Begin Paragraph," "End Paragraph," "Salutation," "Complimentary Closing," and so forth. The user may select one or more of the context options by moving a selection indicator 438 using a scroll tool 439. For our example, the selection indicator 438 is on "Any" context, indicating that the "Symposium, Save the Whales Symposium" is not context limited.

FIG. 4C is a diagram illustrating use of the "Symposium, Save the Whales Symposium" name-completion pair after it has been included in the "Custom Directory" suggestion list. As the user types a partial data entry 440 corresponding to the name entry, initially capitalized "Sym" for our example, the associated completion entry 442, "Save the Whales Symposium" for our example, is automatically displayed in the word completion frame 444. The user may then accept the word completion suggestion 442 by entering a traditional acceptance keystroke, such as the "tab" key or the "enter" key. In this case, the partial data entry 440 "Sym" is replaced by the completion entry 442 "Save the Whales Symposium," and the word completion frame 444 is discontinued.

Figure 5:
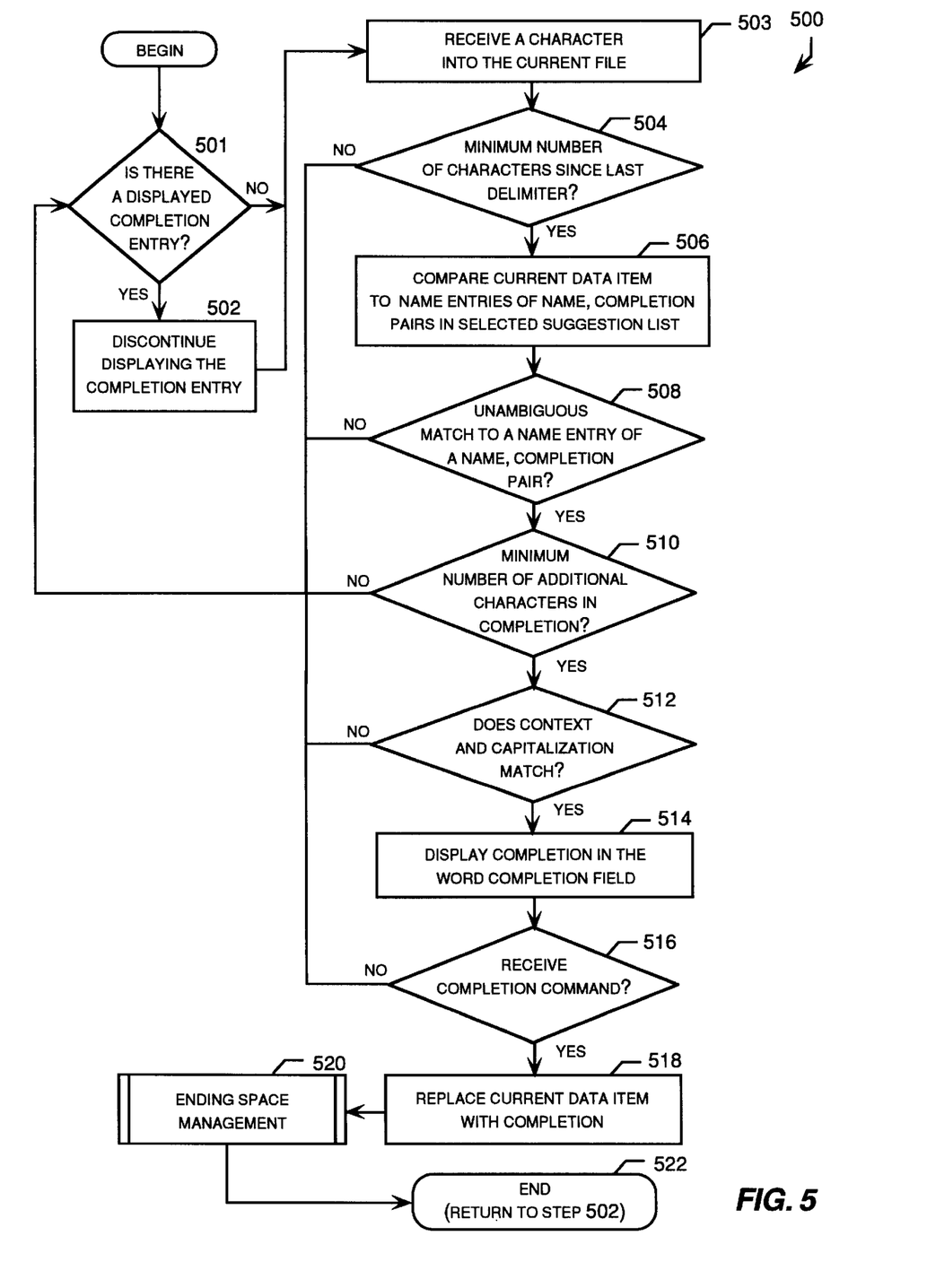
FIG. 5 is a logic flow diagram illustrating the operation of a word completion system in accordance with an exemplary embodiment of the present invention.

FIG. 5 is a logic flow diagram illustrating a routine 500 for operating the Auto-Complete utility 100, which is configured to monitor the entry of data into a current file, such as a word processing or e-mail file. In step 501, the Auto-Complete utility 100 determines whether there a completion entry is currently displayed. If a completion entry is currently displayed, the "YES" branch is followed to step 502, in which the display is discontinued. Step 502 and the "NO" branch from step 501 are followed by step 503, in which the Auto-Complete utility 100 receives a character.

The purpose of steps 501 and 502 is to update the suggested word completion while the user changes the partial data entry. For example, after the user types "Jun" the suggested word completion may be "June 26, 1997." If the user then types an "i" so that the partial data entry is "Juni," the suggested word completion "June 26, 1997" will be discontinued and a new suggested word completion, "Juniper" for instance, may be displayed. Preferably, the suggested word completion does not blink or flash if the user inputs a letter that is consistent with the previously displayed suggestion. To illustrate this using the previous example, the suggestion "June 26, 1997" preferably does not blink if the user follows the partial data entry "Jun" by typing the letter "e."

In step 503, the current file receives a character, typically a keyboard or other text entry. In the following steps 504–512, the Auto-Complete utility 100 applies prediction criteria to determine whether to display a word completion suggestion for the current data item. The Auto-Complete utility 100 applies the prediction criteria to avoid annoying the user by displaying an excessive number of wrong suggestions. For this purpose, the current data item may be a partial data entry including the characters received since the last delimiter character, including the character received in step 504. A delimiter character is a character that signifies the end of a word, such as a space character or punctuation mark.

In step 504, the Auto-Complete utility 100 determines whether a minimum number of characters has been entered since the last delimiter character. That is, the Auto-Complete utility 100 determines whether the current data item includes at least a minimum number of characters. The minimum number of characters for step 504 is preferably a user-definable parameter with a default value of three. If the minimum number of characters has not been entered since the last delimiter character, the "NO" branch is followed back to step 501, in which the data file receives another character.

If the minimum number of characters has been entered since the last delimiter character, the "YES" branch is followed to step 506, in which the Auto-Complete utility 100 compares the current data item to the name entries of name-completion pairs in a selected suggestion list. In step 508, the AutoComplete utility 100 determines whether the current data item unambiguously corresponds to one of the name entries in the suggestion list. That is, rather than selecting a best guess from a set of ambiguously-identified name entries, the Auto-Complete utility 100 waits until the current data item includes a sufficient number of characters to unambiguously correspond to a name entry.

Those skilled in the art will appreciate that many methodologies, some of them quite sophisticated, could be used to select among ambiguously-identified name entries. To illustrate, consider the partial data item "rec," which could correspond to a number of name entries, including "recreation," "recreate," "rectifier," etc. To select a best guess among these ambiguously-identified name entries, a most-recently-used buffer, a probability-ranked dictionary, a multi-word back-chain algorithm, or a combination of these and other word prediction techniques could be used. In particular, these and other sophisticated word prediction techniques may become feasible as computer memory and computational performance improves in the future.

If the current data item does not unambiguously correspond to one of the name entries in the suggestion list, the "NO" branch is followed back to step 501, in which the data file receives another character. If the current data item does unambiguously correspond to one of the name entries in the suggestion list, the "YES" branch is followed to step 510, in which the Auto-Complete utility 100 determines whether the associated completion entry includes at least a minimum number of characters more than the current data item. The minimum number of additional characters for step 510 is preferably a user-definable parameter with a default value of three.

If the completion entry does not include at least a minimum number of characters more than the current data item, the "NO" branch is followed back to step 501, in which the data file receives another character. If the completion entry does include at least a minimum number of characters more than the current data item, the "YES" branch is followed to step 512, in which the Auto-Complete utility 100 determines whether the current data item matches all capitalization and context limitations associated with the corresponding name-completion pair.

If the current data item does not match all capitalization and context limitations associated with the corresponding name-completion pair, the "NO" branch is followed back to step 501, in which the data file receives another character. If the current data item does match all capitalization and context limitations associated with the corresponding name-completion pair, the "YES" branch is followed to step 514, in which the Auto-Complete utility 100 displays the completion entry in the data file as a word completion suggestion for the current data item.

Step 514 is followed by step 516, in which the Auto-Complete utility 100 determines whether a completion command, such as the "tab" key or the "enter" key, is received as the next user input. The completion command indicates acceptance of the suggested word completion. If the completion command is not received as the next user input, the "NO" branch is followed back to step 501, in which the data file receives another character. If the completion command is received as the next user input, the "YES" branch is followed to step 518, in which the Auto-Complete utility 100 replaces the current data with the completion entry from the corresponding name-completion pair and discontinues the display of the word completion suggestion.

Step 518 is followed by routine 520, in which the Auto-Complete utility 100 implements ending space management. Routine 520 is described below with reference to FIG. 6. Routine 520 is followed by the "END" step 522, which returns to step 501, in which the data file receives another character. Thus, routine 500 may continue while the user enters text into the data file.

Figure 6:
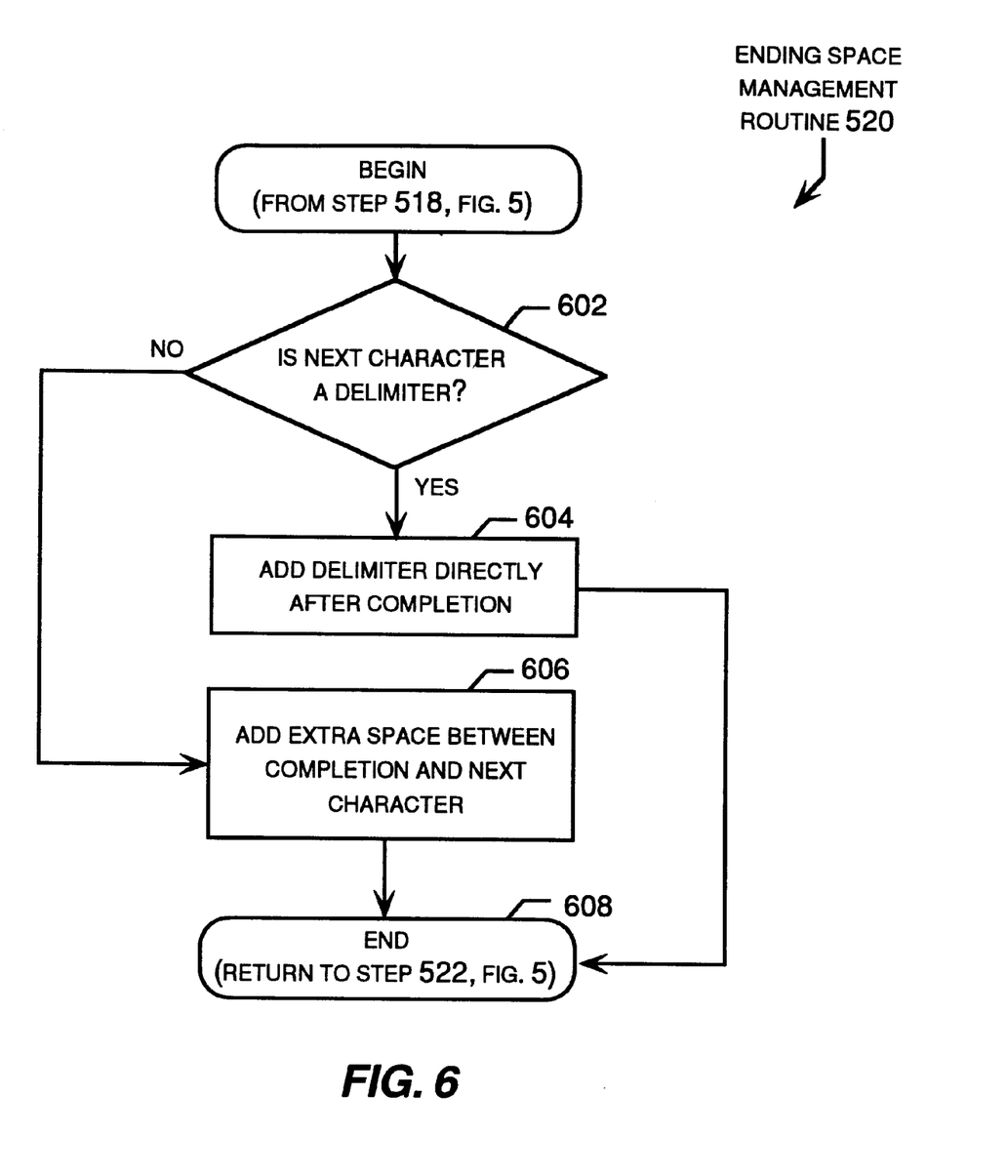
FIG. 6 is a logic flow diagram illustrating an exemplary routine for ending space management in a word completion system.

FIG. 6 is a logic flow diagram illustrating routine 520 for ending space management. Routine 520 follows step 518, shown on FIG. 5. In step 602, the Auto-Complete utility 100 determines whether the next character received by the data file is a delimiter character. If the next character received by the data file is a delimiter character, the "YES" branch is followed to step 604, in which the Auto-Complete utility 100 allows the delimiter character to be added directly after the completion entry. If the next character received by the data file is not a delimiter character, such as a space character or punctuation mark, the "NO" branch is followed to step 606, in which the Auto-Complete utility 100 adds a space character between the completion entry and the next character. Steps 604 and 606 are followed by the "END" step 608, which returns to step 522 shown on FIG. 5.

Figure 7:
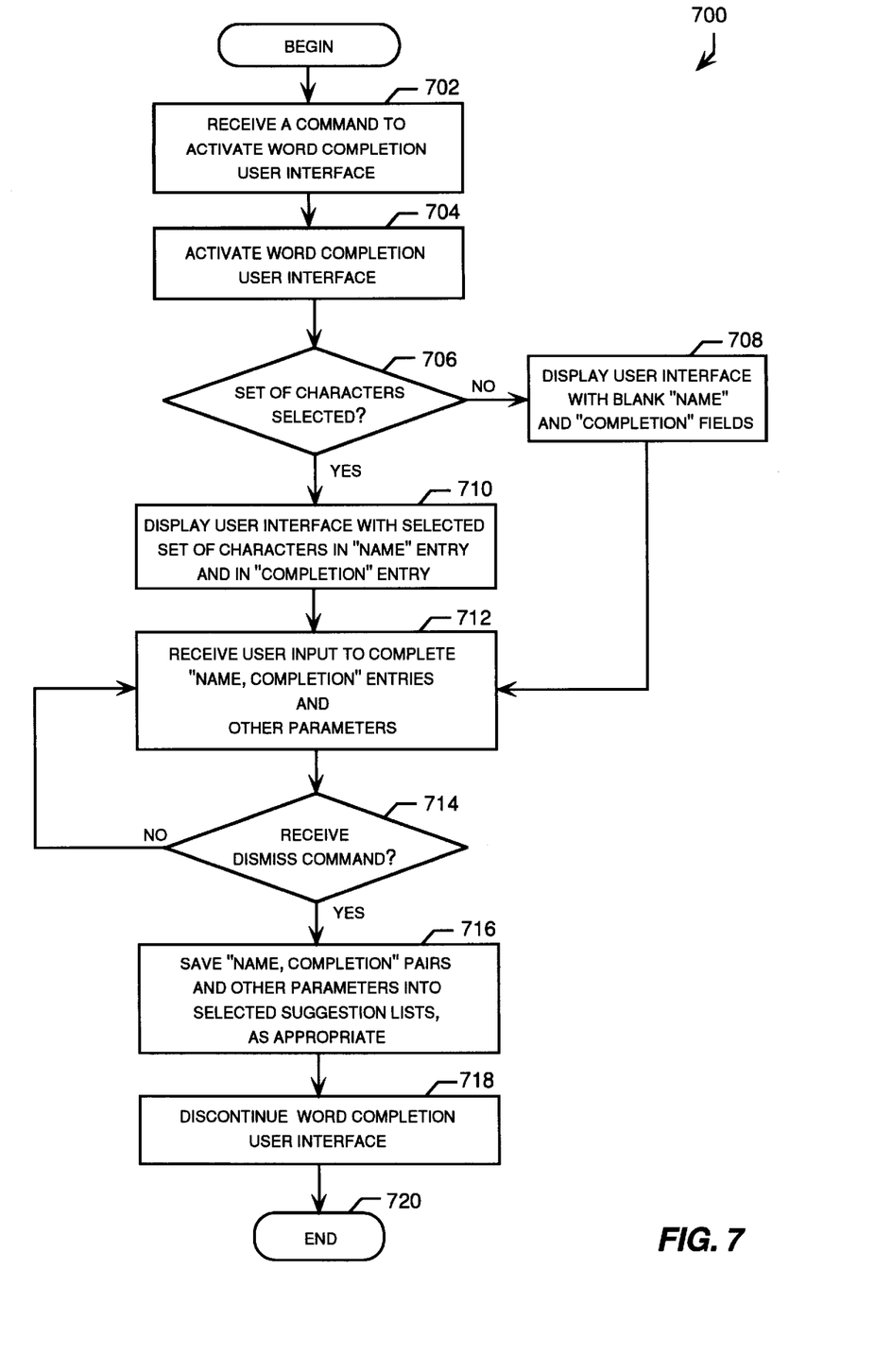
FIG. 7 is a logic flow diagram illustrating an exemplary routine for including a user-defined name-completion pair in a word completion suggestion in a word completion system.

FIG. 7 is a logic flow diagram illustrating routine 700 for including a user-defined name-completion pair in a word completion suggestion list. In step 702, the Auto-Complete utility 100 receives a predefined command, such as "Alt-F3" or another predefined keystroke or keystroke combination, for activating a word completion user interface while a data file is active. In step 704, the Auto-Complete utility 100 causes the word completion user interface to be displayed on the monitor 47. In step 706, the Auto-Complete utility 100 determines whether a set of characters is selected in the data file. If a set of characters is not selected in the data file, the "NO" branch is followed to step 708, in which the word completion user interface is shown with blank name and completion entries.

If a set of characters is selected in the data file, the "YES" branch is followed from step 706 to step 710, in which the name entry and the completion entry of the word completion user interface are shown with the selected set of characters entered. To illustrate, if the data entry "Save the Whales Symposium" is selected in the data file, "Save the Whales Symposium" is automatically entered as both the name entry and the completion entry of a new name, completion pair in the word completion user interface. This facilitates creating name-completion pairs in which the name and completion entries are the same. This type of name-completion pair is particularly useful because the first few letters of a long word or phrase may be used to trigger the entire word or phrase as the suggested completion.

Steps 708 and 710 and followed by step 712, in which the Auto-Complete utility 100 may receive user input within the word completion user interface to complete or alter name and completion entries, select suggestion lists, define capitalization and context limitations, and access other functionality provided by the word completion user interface. In step 714, the Auto-Complete utility 100 determines whether a dismiss command, such as an "OK" or "Cancel" command, has been received. If a dismiss command has not been received, the "NO" branch is followed back to step 712, in which the Auto-Complete utility 100 receives additional user input within the word completion user interface.

If a dismiss command has been received, the "YES" branch is followed from step 714 to step 716, in which the Auto-Complete utility 100 saves the data entered into the word completion user interface, as appropriate. Step 716 is followed by step 718, in which the Auto-Complete utility 100 discontinues the display of the word completion user interface. Step 718 is followed by the "END" step, which returns the user to the data file that was active when the word completion user interface was invoked in step 702.

In view of the foregoing, it will be appreciated that the present invention provides a word completion system that can automatically predict unrestricted word completions for data entries in an unstructured portion of a data file. Although complete words are phrases are the suggested word completions in the examples described above, the invention may also be used to insert other types of data may into a data file, such as foreign language words and phrases, hypertext links, graphics, video data, sound data, and so forth. It should be understood that the foregoing relates only to the exemplary embodiments of the present invention, and that numerous changes may be made therein without departing from the spirit and scope of the invention as defined by the following claims.

The invention claimed is:

1. A computer-readable medium having computer-executable instructions for performing the steps of:
   monitoring data entry into a data file associated with a program module running on a computer system;
   identifying a partial one of the data entries in an unstructured portion of the data file;
   selecting a suggestion list comprising a plurality of associated name-completion pairs to be used in connection with the word completion utility, each name-completion pair including a name entry and a completion entry;
   identifying a set of completion entries in the suggestion list that corresponds to the partial data entry;
   applying a prediction criterion to the set of completion entries and the partial data entry;
   selecting an unambiguously-identified entry from the set of completion entries; and
   displaying the unambiguously-identified entry as a word completion suggestion for the partial data entry.

2. The computer-readable medium of claim 1, wherein selecting an unambiguously-identified entry further comprises selecting a most-recently used entry corresponded to the partial data entry from a most-recently used buffer.

3. The computer-readable medium of claim 1, wherein selecting an unambiguously-identified entry further comprises selecting a highest-probability-ranked entry corresponded to the partial data entry from a probability-ranked dictionary.

4. The computer-readable medium of claim 1, wherein applying a prediction criterion further comprises applying a multi-word back-chain algorithum to the set of completion entries.

5. A computer-readable medium having computer-executable instructions for performing the steps of:
   monitoring data entry into a data file associated with a program module running on a computer system;
   identifying a partial one of the data entries in an unstructured portion of the data file;
   selecting a suggestion list comprising a plurality of associated name-completion pairs, each name-completion pair including a name entry and a completion entry;
   identifying a particular one of the name entries in the suggestion list that corresponds to the partial data entry;
   applying prediction criteria to the particular name entry, the particular completion entry, and the partial data entry; and if the prediction criteria are met, displaying the completion entry associated with the particular name entry as a word completion suggestion for the partial data entry.

6. The computer-readable medium of claim 5, further comprising the steps of:
   receiving a command indicating acceptance of the completion entry;
   replacing the partial data entry with the completion entry in the data file;
   identifying a character immediately following the command indicating acceptance of the completion entry;
   determining whether the character is a delimiter character; and
   if the character is not a delimiter character, inserting a space character in the data file between the completion entry and the character.

7. The computer-readable medium of claim 5, wherein:
   the partial data entry includes a predefined property; and
   the suggestion list is limited to name-completion pairs in which the completion entries include the predefined property.

8. The computer-readable medium of claim 5, wherein:
   the partial data entry is received in a portion of the data file that has been assigned a context label; and
   the suggestion list is associated with the context label.

9. The computer-readable medium of claim 5, wherein the particular completion entry is tied to a dynamic parameter maintained by the computer system.

10. The computer-readable medium of claim 9, wherein the dynamic parameter is selected from the group including a current date and a registered user of the computer system.

11. The computer-readable medium of claim 5, further comprising the step of receiving user input defining the particular name and its associated completion entry.

12. The computer-readable medium of claim 5, wherein the prediction criteria comprises a first condition that the partial data entry include a certain number of characters.

13. The computer-readable medium of claim 11, wherein the prediction criteria further comprises a second condition that the completion entry include a certain number of characters more than the partial data entry.

14. The computer-readable medium of claim 12, wherein the prediction criteria further comprises a third condition that the partial data entry unambiguously correspond to the particular name entry with respect to all of the name entries in the suggestion list.

15. In a computer system, a method for suggesting word completions for partial data entries within data files open in a plurality of application programs, comprising the steps of:
   running a word completion utility on the computer system;
   selecting a suggestion list comprising a plurality of associated name-completion pairs to be used in connection with the word completion utility, each name-completion pair including a name entry and a completion entry;
   running a first application program on the computer system;
   opening a first data file in the first application program and receiving a first partial data entry into the first data file;
   identifying a first name entry in the suggestion list that corresponds to the first partial data entry;
   applying prediction criteria to the first partial data entry, the first name entry, and a first completion entry associated with the first name entry; and if the prediction criteria are met, displaying the first completion entry as a word completion suggestion for the first partial data entry;

running a second application program on the computer system;

opening a second data file in the second application program and receiving a second partial data entry into the second data file;

identifying a second name entry in the suggestion list that corresponds to the second partial data entry;

applying the prediction criteria to the second partial data entry, the second name entry, and the second completion entry associated with the second name entry; and if the prediction are met, displaying the second completion entry as a word completion suggestion for the second partial data entry.

16. The method of claim 15, where in the first partial data entry is received in an unstructured portion of the first data file.

17. The method of claim 15, further comprising the steps of:

receiving a command indicating acceptance of the completion entry associated with the first name entry for the first partial data entry;

replacing the first partial data entry with the completion entry associated with the first name entry in the first data file;

receiving a character immediately following the command indicating acceptance of the completion entry associated with the first name entry;

determining whether the character is a delimiter character; and if the character is not a delimiter character, inserting a space character in the first data file completion entry associated with the first name entry and the character.

18. The method of claim 15, wherein:

the first partial data entry is includes a predefined property;

the suggestion list as applied in connection with the first partial data entry is limited to name-completion pairs in which the completion entries include the predefined property;

the second partial data entry does not include the predefined property; and the suggestion list as applied in connection with the second partial data entry is not limited to name-completion pairs in which the completion entries include the predefined property.

19. The method of claim 15, wherein:

the first partial data entry is received in a portion of the first data file that has been assigned a context label; and the suggestion list is associated with the context label.

20. The method of claim 15, wherein the completion entry associated with the first name entry is tied to a dynamic parameter maintained by the computer system.

21. The method of claim 20, wherein the dynamic parameter is selected from the group including a current date and a registered user of the computer system.

22. The method of claim 15, further comprising the step of receiving user input defining the first name and its associated completion entry.

23. The method of claim 15, wherein the prediction criteria comprises:

a first condition that the first partial data entry include a certain number of characters;

a second condition that the completion entry associated with the first name entry include a certain number of characters more that the first partial data entry; and a third condition that the first partial data entry unambiguously correspond to the first name entry with respect to all of the name entries in the suggestion list.

24. A computer-readable medium having computer-executable instructions for performing the steps of:

running a word completion utility on a computer system;

running an application program on the computer system;

opening a data file in the application program and receiving a partial data entry in an unstructured portion of the data file;

receiving a command indicating a suggestion list comprising a plurality of associated name-completion pairs to be used in connection with the word completion utility, each name-completion pair including a name entry and a completion entry, the suggestion list including, at least one name-completion pair that has been defined previously by user input, and at least one name-completion pair that is tied to a dynamic parameter maintained by the computer system;

identifying a particular one of the name entries in the suggestion list that corresponds to the partial data entry;

applying prediction criteria including, a first condition that the partial data entry include a certain number of characters, a second condition that the completion entry include a certain number of characters more than the partial data entry, and a third condition that the partial data entry unambiguously correspond to the particular name entry with respect to all of the name entries in the suggestion list; and if the prediction criteria are met, displaying the completion entry associated with the particular name entry as a word completion suggestion for the partial data entry.

* * * * *